Patented Nov. 13, 1951

2,575,013

UNITED STATES PATENT OFFICE 2,575,013

PRODUCTION OF REFINED TALL OIL

Torsten Hasselstrom and Michael Stoll, New York, N. Y., assignors, by mesne assignments, to National Distillers Products Corporation, New York, N. Y., a corporation of Virginia No Drawing. Application August 1, 1947, Serial No. 765,628

4 Claims. (Cl. 260—97.7)

This invention relates to a method for the production in good yield of tall oil of improved quality.

Tall oil soap (skimmings) is obtained in quantity in the manufacture of pine wood pulp by the sulfate process, and is composed primarily of an aqueous solution of the sodium salts of various fatty and resin acids, together with a minor but appreciable proportion of non-saponifiables, including sterols, and color bodies. The crude tall oil of commerce is generally produced by acidification, usually with concentrated sulfuric acid, of the aforementioned tall oil soap. Such a process is disadvantageous, however, since when it is practiced the released tall oil contains an undesirable content of color bodies, which must be removed by subsequent refining (e. g., distillation, contacting with an adsorbent, etc.) if the tall oil is to be employed in the preparation of satisfactory esters, alkyd resins, etc.

It is therefore the primary object of this invention to provide a method for the production from a tall oil soap of a tall oil having a decreased content of color bodies.

It is also the object of this invention to provide a method for the production of tall oil in a condition in which it may be easily further refined.

The aforementioned and other objects are accomplished in accordance with this invention by acidifying with sulfuric acid or sodium acid sulfate an intimate mixture of an aqueous tall oil soap containing color bodies and a hydrocarbon solvent. It has been discovered, in accordance with this invention, that when such an aqueous tall oil soap is thus neutralized the released tall oil is of improved color in comparison with a tall oil released by the simple acidification of an aqueous tall oil soap in accordance with the procedure of the prior art. This discovery is surprising since it would be expected that the color bodies, being of an organic nature, would be concentrated to a greater extent in the tall oil-solvent layer, due to the presence therein of the added organic solvent.

The following examples illustrate in detail the practice of the present invention, and are to be considered not limitative thereof.

EXAMPLE I

A quantity of commercial, crude aqueous tall oil soap containing approximately 65% by weight of solids was diluted with water in a ratio of 1:2.5 parts by weight, and "Troluoil" (a proprietary lacquer diluent, being a petroleum hydrocarbon fraction having a boiling range of about 95–120° C.) was added to the diluted aqueous soap solution in a ratio of 1.5:1 parts by weight. The mixture was thereafter acidified with 12-normal sulfuric acid to a pH value within the range 4–5, while the mixture was efficiently stirred and maintained at 70° C. Two layers were present after the mixture had been permitted to stand and cool to room temperature. The lower aqueous layer was drawn off and discarded, and the upper tall oil-"Troluoil" layer was washed with water until it was substantially free of the sulfate ion.

In similar manner, a further quantity of the 65% aqueous tall oil soap was acidified with 12-normal sulfuric acid while it was maintained at 70° C., in accordance with the standard procedure for the releasing of tall oil from an aqueous tall oil soap solution. The tall oil so released was thereafter washed with water until it was substantially free from the sulfate ion. The following table indicates the effect upon the color of the released tall oil of the presence and absence of the solvent in the mixture when the tall oil soap is acidified.

TABLE

*Color using Gardener–1933 Scale*

| | Acidification in the presence of "Troluoil" | | Acidification in the absence of "Troluoil" | |
|---|---|---|---|---|
| | H₂O Wash | No Wash With H₂O | H₂O Wash | No Wash With H₂O |
| 40% solids in "Troluoil" | 13 | 14½ | 15¼ | 16¼ |

In the foregoing example, the method of the present invention was practiced on a crude aqueous tall oil soap. It is not necessary, however, that the tall oil soap employed be crude. The method of this invention may, in fact, be efficiently used in the production of an improved tall oil from any aqueous tall oil soap solution containing color bodies, as the following examples illustrate.

EXAMPLE II

To 3,000 ml. of ether-extracted aqueous tall oil soap containing 20% by weight of solids (1.7% non-saponifiables, 50.0% resin acids and 48.3% fatty acids) was added 1,500 ml. of "Troluoil," and the mixture was thereafter acidified with 12-normal sulfuric acid until a pH value of 4 was obtained. The acidification was carried out with efficient agitation at a temperature of about 70° C. After standing and cooling, the lower aqueous layer which separated was drawn off from the upper tall oil-"Troluoil" layer, and was then discarded. The tall oil solution was then washed three times with 4,500 ml. of water each time, in order to remove sulfates from the tall oil solution. The tall oil thus produced had improved color, in comparison with the tall oil released from the same ether-extracted tall oil soap, and was further refined as indicated in the following paragraph.

After the tall oil solution had been diluted with further amounts of "Troluoil" until it had a concentration of about one volume of tall oil to 8 volumes of the "Troluoil," the solution was stirred with about 250 gms. of fuller's earth for about 15 minutes. After filtering the solution, the "Troluoil" was distilled off using steam, and the last traces of solvent and moisture were removed in vacuum. The resultant refined tall oil had a color of about 8 on the Gardner-1933 scale.

EXAMPLE III 139 parts by weight of crude aqueous tall oil soap containing 65% by weight of solids was dissolved in 839 parts by weight of methyl isobutyl ketone at the reflux temperature of the latter. To this solution was then added 800 parts by weight of water at a temperature of about 60° C. In about 15 minutes, the mixture separated into two layers, and the aqueous tall oil soap layer was removed by gravity from the upper solvent layer. The aqueous tall oil soap layer was thereafter subjected to four subsequent washes with an equal amount of methyl isobutyl ketone each time by the intimate mixing of the solvent and the aqueous tall oil soap layer at reflux temperatures. The aqueous tall oil soap layer was then separated and heated to boiling in order to remove and recover any methyl isobutyl ketone dissolved therein.

While being heated at a temperature of about 70° C., in intimate admixture with petroleum naphtha (2 parts of naphtha per part of tall oil by weight), the solution was thereafter acidified to a pH value of about 5, the acidification being effected using 66° Baumé sulfuric acid. After cooling and separating, the upper tall oil layer had a Gardner-1933 color of 18 plus and was considerably lighter in color than a comparison tall oil released in the absence of the naphtha.

After the naphtha had been distilled off, the tall oil was dissolved in 4 parts by weight of hexane. The tall oil-hexane solution was then washed with water and filtered to remove insoluble color bodies. The filtrate was stirred for 15 minutes with 60% by weight of an activated diatomaceous earth, filtered and stripped of solvent, yielding a bleached tall oil having a Gardner-1933 color of 6¾. In the entire process of this example, color bodies were removed to the extent of 3–5% of the total charge. The composition of the tall oil thus produced was, however, not substantially changed, since the tall oil produced contained 0.6% non-saponifiables, 36.4% of resin acids and 63.0% of fatty acids, as compared with 0.6% non-saponifiables, 37.0% resin acids and 62.4% in the tall oil released by acidification of the tall oil soap after the methyl isobutyl ketone had been removed.

As Examples II and III illustrate, the aqueous tall oil soap acidified in accordance with the present invention may be pre-extracted with certain ketones in order to remove undesirable non-saponifiables, as described in the application of Torsten Hasselstrom and Michael Stoll, Serial No. 757,329, filed June 26, 1947, now U. S. Patent No. 2,547,208, and entitled "Method for the Refining of Tall Oil Soap." Alternatively, the aqueous tall oil soap solution acidified may be pre-extracted for the same purposes, with ether, hexane, etc., in accordance with procedures which are well understood in the art. In addition, there may be produced in accordance with this invention a refined tall oil by acidifying a concentrated aqueous tall oil soap which has been diluted with water, for example, until it contains about 10% by weight of solids, and thereafter permitting the diluted solution to settle for a period of time sufficient to permit certain color bodies to precipitate. This procedure has been described in the application, Serial No. 761,732, filed July 17, 1947, now U. S. Patent No. 2,519,903, and entitled "Removal of the Sodium Salt of Lignoceric Acid and Other Materials from a Tall Oil Soap." Furthermore, if desired, the aqueous tall oil soap may be precontacted with a filtering aid, in order to remove certain color bodies, prior to a further removal thereof in accordance with the present invention. Thus, to the diluted aqueous tall oil soap solution there may be added from about 5 to about 25% of filtering aid (e. g., fuller's earth, diatomaceous earth, activated clay, etc.) based upon the weight of total solids in the solution. The mixture should then be stirred for about 10–30 minutes, and then filtered to obtain a clear soap solution and a filter cake.

The method of the present invention may be practiced on an aqueous tall oil soap solution containing color bodies and containing a wide range of total solids. In general, however, such aqueous tall oil soap solutions should contain from about 5 to about 75% or more of total solids, the upper limit of concentration being determined by the ease of handling the aqueous mixture as a liquid. Preferably, however, the aqueous tall oil soap solution which is acidified while in contact with a solvent should contain from about 10 to about 35% by weight of total solids.

Any hydrocarbon solvent may be substituted for the "Troluoil" and naptha employed in the examples. Hence, among such suitable alternative solvents are the normally liquid hydrocarbons (e. g., n-pentane, n-hexane, n-heptane, 2,2,4 - trimethylpentane, 2 - ethylhexane, n - dodecane, cyclopentane, methylcyclopentane, cyclohexane, benzene, toluene, o-xylene, n-xylene, p-xylene, ethylbenzene, decahydronaphthalene, tetrahydronaphthalene, petroleum ether, gasoline, benzine, kerosene, etc.), or mixtures thereof. Liquid propane and liquid butane are also suitable solvents, but are preferably not used because they require superatmospheric pressures. The acidification should generally be effected within the temperature range from about 0 to about 110° C., and preferably within the temperature range from about 30 to about 100° C. Furthermore, from about 1 to about 5, and preferably from about 2 to about 3, parts by weight of solvent per part of total tall oil solids in aqueous solution are used.

In the examples the improved tall oil was obtained by neutralizing the tall oil soap with sulfuric acid. In place of sulfuric acid, however, there may be substituted sodium acid sulfate, a material which is relatively inexpensive and readily available. Furthermore, although the strength of the acidic material may be varied over a wide range, it is preferable, when sulfuric acid is employed, that its strength be at least 25%, in order to economize with respect to the size of the reaction vessel. In addition, the acidification of the tall oil soap should be continued until the pH value of the mixture is below 7, and is preferably within the range from about 4 to about 6.

In order that the method of this invention may be most successfully practiced, it is essential that the tall oil soap be acidified while in intimate contact with the solvent. Such contact may be realized by vigorous stirring of the mixture, by agitating the mixture with a stream of inert gas such as nitrogen, by pumping the mixture, and by other methods which are well understood in the art. After the acidification and release of the tall oil has been completed, the mixture should be permitted to stand for a period of time sufficient to permit a sharp separation of the aqueous phase from the solvent phase. The latter should then be separated and washed in order to remove inorganic materials therefrom, if the most desirable product is to be obtained.

After the solvent phase has been washed with water, it may be distilled in order to effect a separation of the tall oil from the solvent, or the solution may be contacted with an adsorbent, in accordance with known procedures, to effect a further removal of color bodies from the tall oil, as is illustrated by the examples. Selective esterification, or cooling of the tall oil-solvent solution, may also be employed as a subsequent step to separate the resin acids from the fatty acids, yielding a product of enhanced utility in the manufacture of esters and alkyd resins.

We claim:

1. The method for the production of a refined tall oil which comprises admixing a material selected from the group consisting of sulfuric acid and sodium acid sulfate with an intimate mixture of an aqueous tall oil soap, containing sterols and color bodies, and a hydrocarbon solvent until the pH value of the aqueous phase is below 7, permitting the mixture to stand for a period sufficient for the formation of an aqueous lower layer containing color bodies and a supernatant layer containing tall oil dissolved in the solvent, discarding the lower aqueous layer and recovering the tall oil from the supernatant solvent layer.

2. The method for the production of a refined tall oil which comprises admixing sulfuric acid with an intimate mixture of an aqueous tall oil soap, containing sterols and color bodies, and a hydrocarbon solvent until the pH value of the aqueous phase is below 7, permitting the mixture to stand for a period sufficient for the formation of an aqueous lower layer containing color bodies and a supernatant layer containing tall oil dissolved in the solvent, discarding the lower aqueous layer and recovering the tall oil from the supernatant solvent layer.

3. The method for the production of a refined tall oil which comprises admixing a material selected from the group consisting of sulfuric acid and sodium acid sulfate with an intimate mixture of an aqueous tall oil soap, containing sterols and color bodies, and a normally liquid hydrocarbon until the pH value of the aqueous phase is below 7, permitting the mixture to stand for a period sufficient for the formation of an aqueous lower layer containing color bodies and a supernatant layer containing tall oil dissolved in the solvent, discarding the lower aqueous layer and recovering the tall oil from the supernatant solvent layer.

4. The method for the production of a refined tall oil which comprises admixing a material selected from the group consisting of sulfuric acid and sodium acid sulfate with an intimate mixture of an aqueous tall oil soap, containing sterols and color bodies, and containing from about 5 to about 75% by weight of total solids and from about 1 to about 5 parts, per part of total tall oil solids in the aqueous tall oil soap, of a hydrocarbon solvent until the pH value of the aqueous phase is below 7, permitting the mixture to stand for a period sufficient for the formation of an aqueous lower layer containing color bodies and a supernatant layer containing tall oil dissolved in the solvent, discarding the lower aqueous layer and recovering the tall oil from the supernatant solvent layer.

TORSTEN HASSELSTROM.
MICHAEL STOLL.

REFERENCES CITED

The following references are of record in the file of this patent:

UNITED STATES PATENTS

| Number | Name | Date |
| --- | --- | --- |
| 2,223,850 | Gayer | Dec. 3, 1940 |
| 2,395,283 | Lovas et al. | Feb. 19, 1946 |
| 2,430,029 | Pollak | Nov. 4, 1947 |